United States Patent [19]

Gics et al.

[11] Patent Number: 5,632,924
[45] Date of Patent: May 27, 1997

[54] MUFFIN TRAY AND PROCESS FOR BAKING MUFFINS

[75] Inventors: Paul W. Gics, Sewickley Heights, Pa.; Karen A. Parucki, Angola, N.Y.; Steven J. White, Turnersville; Larry L. Wuethrich, Vincentown, both of N.J.

[73] Assignee: H.J. Heinz Company, Pittsburgh, Pa.

[21] Appl. No.: 329,477

[22] Filed: Oct. 26, 1994

[51] Int. Cl.$^6$ .............................. A47J 27/00; A21C 11/00
[52] U.S. Cl. .................... 249/111; 249/119; 249/121; 249/134; 249/DIG. 1; 99/372; 99/DIG. 15
[58] Field of Search .................... 249/111, 121, 249/134, DIG. 1, 119; 99/DIG. 15, 373, 372

[56] References Cited

U.S. PATENT DOCUMENTS

| | | | |
|---|---|---|---|
| 497,606 | 5/1893 | Richardson | 249/DIG. 1 |
| 1,476,910 | 12/1923 | Naugle | 249/DIG. 1 |
| 2,174,425 | 9/1939 | Schlumbohm | 249/DIG. 1 |
| 3,252,683 | 5/1966 | Uetmann | 249/DIG. 1 |
| 3,483,908 | 12/1969 | Donovan | 99/DIG. 15 |
| 4,296,682 | 10/1981 | Thompson | 99/426 |
| 4,676,151 | 6/1987 | Gorsuch et al. | 99/DIG. 15 |
| 4,737,389 | 4/1988 | Hartsing, Jr. et al. | 428/35 |
| 4,866,235 | 9/1989 | Griffin et al. | 219/10.55 |
| 4,924,048 | 5/1990 | Bunce et al. | 99/DIG. 15 |
| 4,933,526 | 6/1990 | Fisher et al. | 219/10.55 |
| 5,124,519 | 6/1992 | Roy et al. | 219/10.55 |
| 5,213,227 | 5/1993 | Koyama et al. | 220/359 |

*Primary Examiner*—Khanh P. Nguyen
*Attorney, Agent, or Firm*—Burns, Doane, Swecker & Mathis, L.L.P.

[57] ABSTRACT

A muffin tray made from modified crystalline polyethylene terephthalate has a plurality of baking wells with heat-transfer inhibiting bottoms, and protruding circumferential ridges to accommodate differential thermal expansion while limiting related distortion. The muffin tray is used in a baking process having a baking step using a spiral oven with a water bath therein. Hot air is directed into close surface contact with the water pool and then into cross-flow relationship with the muffin trays to effect baking of muffin batter.

8 Claims, 9 Drawing Sheets

MUFFIN TRAY AND PROCESS FOR BAKING MUFFINS

BACKGROUND OF THE INVENTION

This invention relates generally to muffin baking and merchandizing processes and apparatus for baking muffins. More particularly, the invention deals with a continuous process for muffin baking in a humidity controlled spiral oven and a muffin pan for baking, shipping, and merchandising the muffin product.

As used herein, muffins are to be distinguished from other baked products such as cakes, cookies, and breads. Muffins are characterized by a brief baking time, a leavening effected by baking powder, and a cellular texture. By contrast, cakes have a longer baking time, a leavening typically effected by baking soda, and a cohesive texture. Cookies have a short baking time, an absence of leavening, and a cohesive texture. Breads have a long baking time, a yeast leavening, and a cohesive textures.

Some commercial muffin baking processes are batch processes. That is, a quantity of batter is prepared, placed in appropriately shaped pans, and baked-one or more pans at a time. Larger scale commercial baking, however, uses a continuous baking process. In such continuous baking processes, the batter is prepared in such a volume that the baking process can continue virtually without interruption. Individual baking pans are filled at a filling station, advanced through an oven in a continuous succession, allowed to cool in the cooking pans, the pans are inverted to dislodge the baked muffins, and the muffins are packaged and shipped. The empty muffin pans are cleaned and returned to the filling station for reuse.

Such baking processes are replete with problems. For example, the washing of each pan once during each baking cycle consumes large quantities of cleansing water. Waste water treatment imposes an economic burden on these commercial processes. Moreover, periodically each pan must be reglazed with a release coating imposing a further complexity and non-recoverable expense. Furthermore, the inversion and dumping step subject the fragile muffins to a mechanical stress that damages a substantial proportion of them. Periodically pans must be replaced due to that handling damage. Here again, that mechanical damage imposes a further economic burden on the process.

Batch processes for baking muffins have attempted to avoid some of the economic burdens imposed on commercial muffin baking processes by using a plastic muffin tray in which the muffins are baked, shipped, and merchandised. Those muffin trays do not, however, lend themselves to use in continuous processes.

Muffin pans were originally fabricated from metal-a suitable material for use in continuous baking processes. Crystallized polyethylene terephthalate has been proposed for use as an ovenable frozen food tray/cookware combination. (See U.S. Pat. No. 4,737,389, to Harsing, Jr. et at., issued Apr. 12, 1988). Such material, however, is indicated to be quite brittle at temperatures as low as −40° F. making the material only marginally acceptable for use as a frozen food tray material. (See Col. 2, lines 47–51).

Thermoplastics, such as styrene, have been proposed for use as a container for cupcakes. Spiraling or concentric annular grooves can be used in the bottom of the container cells so that the bottom of each recess can move relative to the corresponding sidewall. (See U.S. Pat. No. 3,483,908, issued to Donovan on Dec. 16, 1969). A film or sheet of plastic, paper, or the like can be hermetically sealed to cover the openings of the recesses.

An ornamental design for muffin trays is known which includes a recessed land at the top of each muffin cup. (See U.S. Design Pat. No. D 346,528, issued to Crawford et al. on May 3, 1994).

Other patents of interest include U.S. Design Pat. No. 27,936, issued to Schmidt on Dec. 7, 1987; U.S. Pat. No. 936,232 issued to Musser on Oct. 12, 1909; U.S. Pat. No. 1,719,842 issued to Jackson on Jul. 9, 1929; U.S. Pat. No. 3,099,377 issued to Metzler et al. on Jul. 30, 1963; U.S. Pat. No. 4,296,682 issued to Thompson on Oct. 27, 1981; and U.S. Pat. No. 5,213,227, issued to Koyama et at. on May 25, 1993.

OBJECTS AND SUMMARY OF THE INVENTION

A general object of the present invention is to overcome problems associated with prior art processes and muffin trays.

A more specific object of the present invention is to provide a muffin tray fashioned from a thermoplastic material configured to retain shape during baking processes, to provide uniform baking of muffins, and to be suitable for use as a shipping and merchandising container.

Another specific object of the present invention is a continuous muffin baking process using disposable thermoplastic muffin trays.

These objects are satisfied by muffin tray fashioned from crystallized polyethylene terephthalate (CPET) having a plurality of regularly spaced baking wells. Rigidity of the muffin tray is enhanced by surrounding the top edge of each baking well with a raised lip. Moreover, uniform baking of the muffin product in a thermally insulating material is assured by providing a heat transfer inhibiting arrangement in the bottom of each baking well.

A conforming lid may also be provided to cooperate with the disposable baking tray so that the baked product can be both shipped and merchandized directly without removal from the baking tray.

An improved labelling process and label arrangement are also part of this invention. A shrink wrapped band wraps the muffin pan and lid and is heat sealed to itself such that the band has improved scuff resistance and has a tab for removal of the band. The band provides tamper-evident security to the package contents.

A muffin baking process which advantageously uses the disposable muffin tray is exemplified by supporting the batter-filled, disposable muffin trays on a continuously moving open mesh belt which passes through an oven. Heated air which moves in crossflow relationship with the batter-filled muffin trays convectively heats the muffin trays and batter. That heated air is constrained to pass over a controlled-temperature water bath before moving into baking relationship with the muffin trays.

This muffin baking process may be suitably performed in a spiral-type oven where a mesh belt supports the trays and traverses a circle with a vertical upward lead. By containing the baking air in an annular channel defined by the inner and outer extremities of the mesh belt, an annular region is defined through which the batter-filled muffin trays move in spiral fashion.

Humidity control of the heated air is attained by flooding the bottom of the oven chamber with water. As heated air is directed to the annular region, that air must pass in moisture-receiving relationship with the water surface. Increased humidity in the baking air reduces moisture transfer from the muffin batter during baking so that the baked muffin retains internal moisture.

BRIEF DESCRIPTION OF THE DRAWINGS

Many other objects and advantages will be apparent to those skilled in the art when this specification is read in conjunction with the attached drawings in which like reference numerals are associated with like elements and wherein.

DESCRIPTION OF THE PREFERRED EMBODIMENTS

Figure 1:
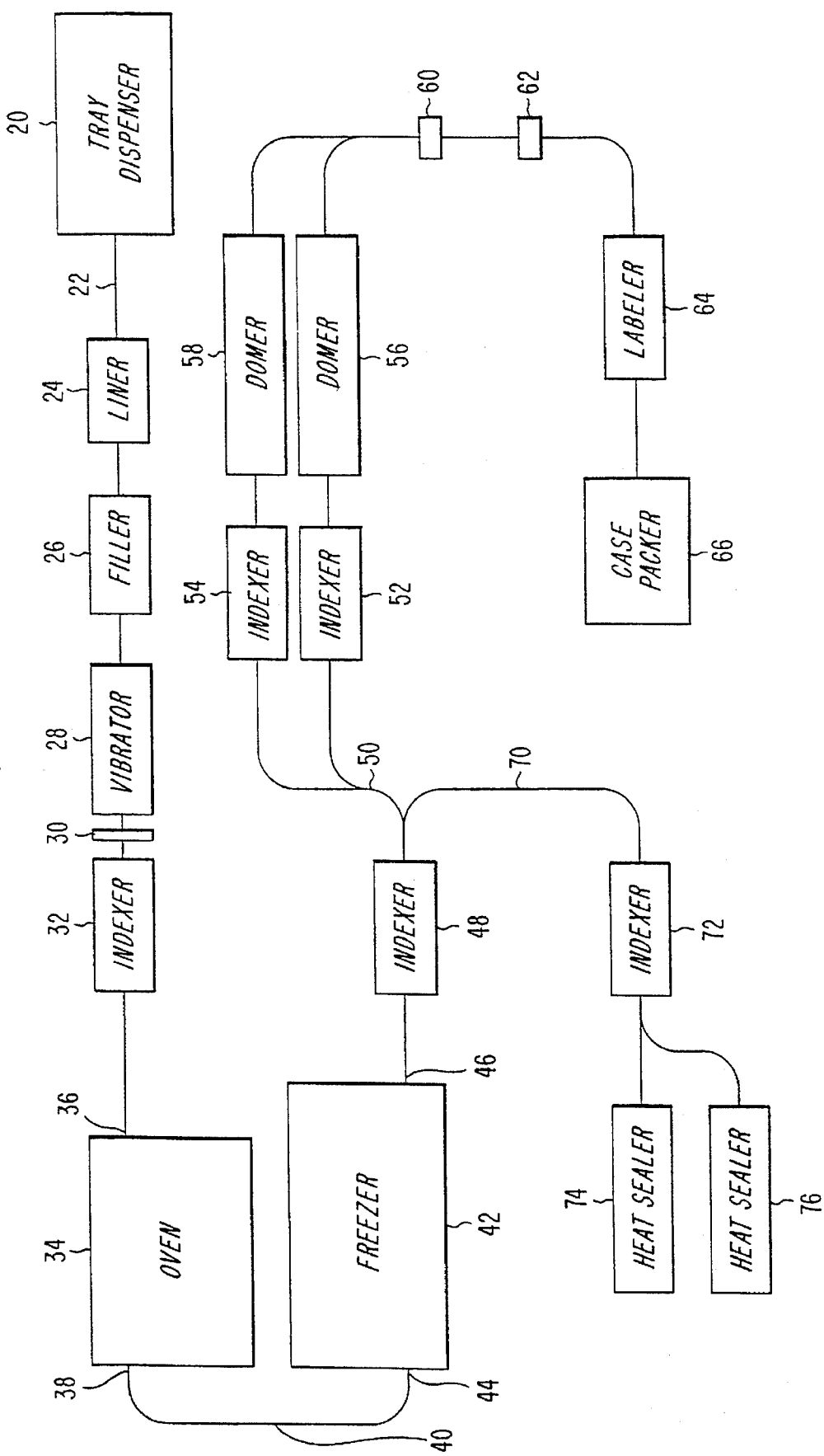
FIG. 1 is a flow diagram of a muffin baking process in accordance with this invention.

The new process for continuously baking muffins is best understood by following the process from the beginning to the end (see FIG. 1). At a tray dispensing station 20 of a fill line, thermoplastic muffin trays are arrayed on the top surface of a suitable conventional conveyor assembly 22. The muffin trays can have any of a myriad of configurations: i.e., without limitation, the baking wells of each tray can be arranged in 1, 2, or 3 rows of 2, 3, 4, 5, or 6 wells. Naturally, subsequent processing equipment in the process line will conform to handle whichever muffin tray configuration is adopted.

The conveyor assembly 22 advances the empty muffin trays from the tray dispensing station 20 to the liner dispensing unit 24 where a conventional pleated paper liner is delivered to each well of each muffin tray. With the paper liners in place, the conveyor assembly 22 moves the muffin trays to a filling station 26 where a predetermined volume of muffin batter is delivered or dispensed to each paper liner. The muffin batter is prepared elsewhere and is delivered to the baking line either continuously or in batches at sufficiently frequent intervals that muffin trays can be continuously filled at the filling station 26. Typically, the muffin batter is at a temperature in the range of 55° to 72° F., preferably about 68° F.

Considering the viscous nature of the muffin batter, uniform baked results are attained only if all muffins are baked from essentially identical shapes and quantities of batter. To this end, the conveyor assembly 22 advances trays with filled muffin papers through a vibrator station 28 where overhead vibrators with travelling buckets impart a shaking action on the muffin trays to level the muffin batter in the muffin papers. As the conveyor assembly 22 moves trays from the vibrator station 28, the trays also pass through a spray station 30. At the spray station 30, a thin surface coating of moisture is applied to the batter top to impede premature drying of that surface during baking. Suitable conventional vibrators, spray heads, and the like can be used. Raque Foods of Louisville, Ky., has been found to be a useful source for acquiring suitable components.

These prepared muffin trays pass through an indexing unit 32 where the trays are arranged in slightly offset parallel lines of trays. This rearrangement of trays establishes a higher density of trays on the conveyor and, at the same time, allows the trays to be advanced at a slower speed so that appropriate residence time in the oven is attained. The rearranged trays are delivered by the conveyer assembly 22 to the apron 36 of a spiral oven 34. Rearrangement of the trays into an integral number of parallel lines permits the conveyer assembly 22 to operate at a higher linear speed that the linear speed through the even. In fact, the ratio of (i) the linear speed of the conveyer assembly 22 to (ii) the linear speed of the conveyer in the oven 34 is the same integral number.

The filled trays spend in the range of 15–30 minutes passing through the oven 34 during which time the muffin batter blossoms and bakes to the desired degree of doneness. The specific amount of baking time depends on the volume of batter being baked in each muffin well. Baked muffins, still in their respective muffin trays, are discharged from the oven 34 onto a discharge apron 38. That discharge apron 38 delivers the trays of baked muffins to an intermediate conveyer assembly 40 which, in turn, advances the trays of baked muffins to the feed apron 44 of a freezer 42. Some controlled cooling of the baked muffins occurs during transfer from the oven 34 to the freezer 42. For example, fans may be used to pass air over the hot muffins thereby removing the flash heat in the muffins and the muffin trays. However, during traversal of the freezer 42, the freshly baked muffins are slowly frozen to a temperature of about 10°–28° F., preferably about 15° F. The slow freezing process is selected to avoid collapsing the cellular structure of the baked muffins. By way of example, the muffins take about 1 hour to pass through the freezer.

When freezing baked muffins, the freezer 42 is operated so that the coldest temperature is in the bottom while a substantially warmer temperature prevails at the top. For example, the temperature at the top of the freezer 42 where the warm, freshly baked muffins enter may be on the order of 30° F., whereas the temperature in the bottom of the freezer 42 may be around −20° F. This temperature gradient provides a relatively low temperature difference between the muffins and the freezer air, which in conjunction with the long traversal time, provides a gradual freezing of the muffins. That slow freeze operation minimizes collapse of cell structure in the muffin so as to retain texture when thawed.

As the trays of frozen muffins leave the discharge apron 46 of the freezer 42, the muffin trays enter an indexer unit 48 which rearranges the trays of frozen muffins into a single file line of trays. A packaging conveyor system 50 receives the single-file line of trays of frozen muffins, and delivers each tray to one of two parallel covering stations. Each covering station includes an indexer 52, 54 and a multi-head domer unit 56, 58 where a clear plastic cover is applied to each tray of frozen muffins. In addition, a tamper-evident label is applied to the covered package.

The packaging conveyor system 50 then coordinates the covered trays from the two covering stations and advances the covered trays to a check weigher 60. The check weigher compares the weight of each covered tray of frozen muffins to be sure that the weight is within predetermined tolerances. Underweight trays are diverted for visual inspection.

From the check weigher 60, the covered banded trays advance to a metal detector 62 where each tray and the frozen product is scanned for the presence of metal. Clearly, muffins are expected to be devoid of metal. Accordingly, if any metal is detected, the tray is rejected.

After successfully passing the check weigher 60 and the metal detector 62, the covered banded trays of frozen muffins are advanced by the packaging conveyor system 50 to a suitable conventional label placer 64 where each package is appropriately labeled with tamper indicating labels. Next, the banded covered trays of frozen muffins advance to Brenton two-station case packer where they are put in cases for shipment to a distributor or retailer.

The indexers, domers, check weighers and metal detectors are commercially available from a variety of sources. Moreover, it is possible to arrange with distributors such as Raque Foods to acquire the various indexer, domer, check weigher, metal detector, and case packer units used in the baking/freezing/packaging system.

When cases of frozen muffins are received by the retailer, the retailer allows them to thaw and places the labeled, covered trays of baked muffins in an appropriate merchandising display for purchase by a household consumer.

In contrast to baking processes for prepared consumer muffin products, some distributors purchase frozen muffin batter and bake that batter on their own premises to provide freshly baked products for retail sale. In the past, such muffin batter has typically been supplied in containers, e.g., 5 gallon units, that are pre-frozen. Such distributors then thaw the containers, parcel the batter into muffin pans, bake the muffins, and sell those muffins. Since the shelf life of thawed batter is generally a matter of hours, when large quantities of batter are thawed near the end of a sales day, significant waste occurs.

With straightforward additional equipment, the baking line described above can provide muffin pans with frozen batter ready for baking by a distributor and thereby substantially eliminate such waste. More particularly, the packaging conveyor assembly 50 may be provided with an alternate path 70 leading to an indexer 72 and a pair of heat sealing devices 74, 76.

During use of this alternate arrangement, the sprayer 30 in the fill line is turned off, the oven heater is turned off, and the freezer operating temperatures are adjusted to provide the quickest freeze possible, but the liner unit 24, the filling unit 26, the vibrator 28, and indexing unit 32 operate as described above. However, while the batter passes through the oven 34, the oven is cool and unheated. As a result, when the unbaked, batter-filled trays enter the freezer 42, the batter is frozen in individual baking wells.

As the frozen, unbaked, batter-filled trays are discharged from the freezer 42, they are directed to the alternate path 70 of the packaging conveyor assembly 50. The indexer 72 then delivers the trays to one of the two heat seal units 74, 76. In those units, a sheet of plastic material is heat sealed to the perimeter of each baking well. Thereafter, the muffin trays are packaged for shipment.

At the retail baker level, the heat-sealed trays of frozen, unbaked muffin batter are defrosted as needed. Should the tray be placed on its side, the individually sealed wells prevent the pre-proportioned batter from being inadvertently mixed between adjacent wells. Moreover, at the end of a retail day, there is considerably reduced waste since only one or more thawed trays of unbaked muffin batter are likely to be wasted.

Significant advantages result from both the baked muffin process and the frozen muffin batter arrangement. As to the baked muffin process, waste water treatment fees are virtually eliminated since the continuous washing of muffin pans is entirely eliminated. By shipping and merchandizing the baked muffins in the same tray used for baking, waste from breakage and mishandling are virtually eliminated. Furthermore, manpower savings are attained from reducing the need to cull damaged muffins from the line, and from fewer packaging and handling steps.

As to the trays of unbaked, frozen muffin batter for retail bakers, economies of reduced waste are attained since the package unit is much smaller. Additional savings result from the prepackaged baking tray-the retail baker does not have to manually dispense the muffin batter, and there is no need to clean baking pans-both resulting in more efficient muffin delivery.

Figure 2:
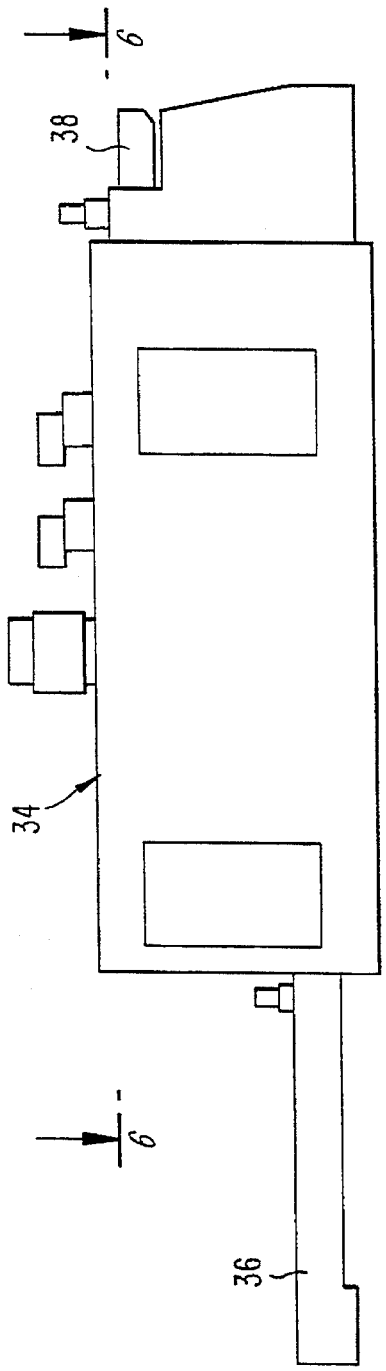
FIG. 2 is an elevation of an oven used in the muffin baking process.

An important aspect of the muffin baking process is the actual baking step itself. To this end, the process described herein includes an oven 34 which is a spiral convention oven. The spiral convention oven is an otherwise conventional Stein GYRoCOMPACT oven available from Frigoscandia which is modified (i) to have a water bath in the bottom and (ii) to have heated air supplied to the bottom rather than the top portion. In elevation (see FIG. 2) the feed apron 36 is positioned on one side and the discharge apron 38 is located on the opposite side of the oven 34. Moreover, the discharge apron 38 leaves the oven 34 near its top while the feed apron 36 introduces material for baking near the bottom of the oven 34. Considering this elevational difference, the intermediate conveyor assembly 40 (see FIG. 1), has a higher elevation than the feed conveyor assembly 22.

Figure 3:
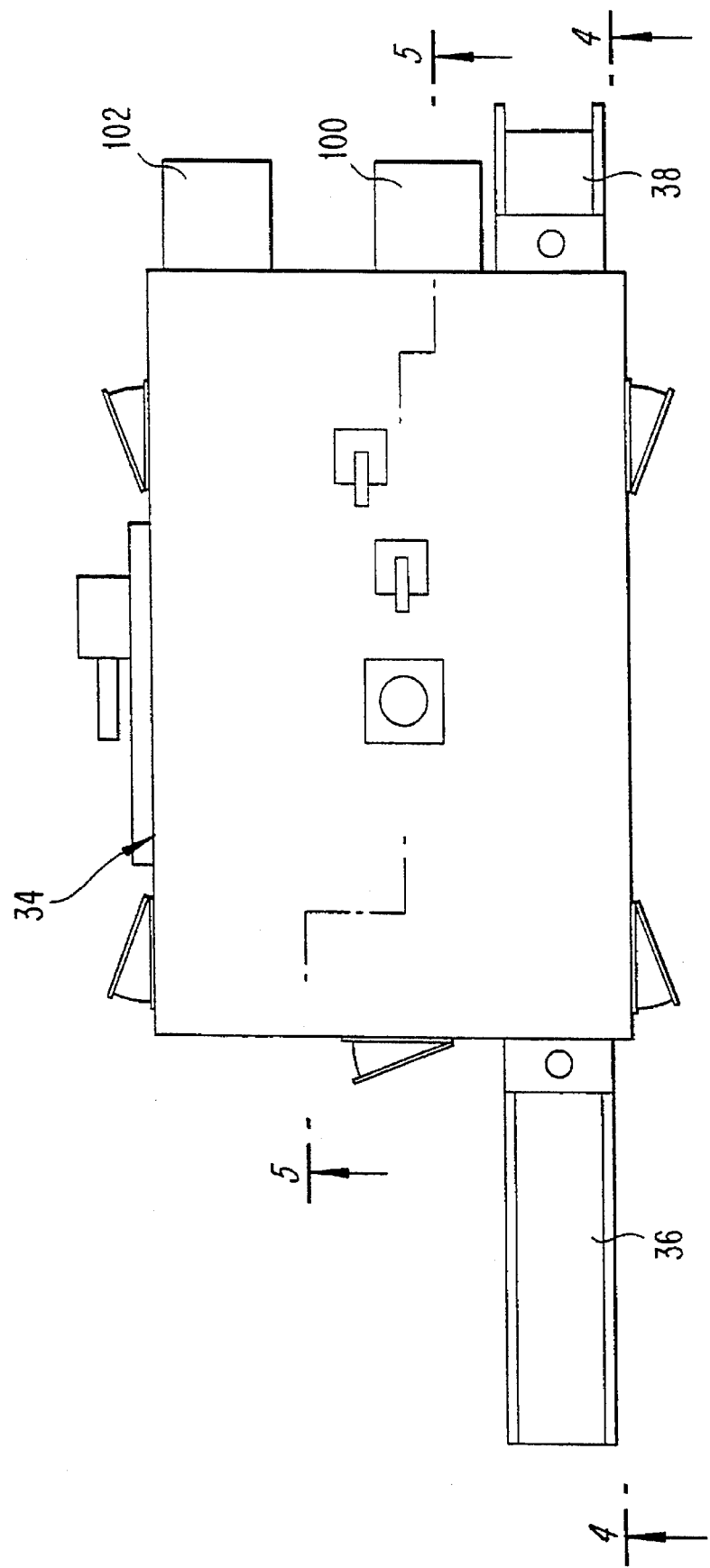
FIG. 3 is a plan view of the oven of FIG. 2.

The feed apron 36 is longitudinally aligned with the discharge apron (see FIG. 3) so that the bake products advance ultimately from one side of the oven 34 to the other side thereof. The oven 34 includes a plurality of otherwise conventional access doors on three of its sides to permit access to the oven interior for maintenance and the like. In addition, the oven 34 has a pair of heater units 100, 102 located at the discharge side of the oven 34.

Figure 4:
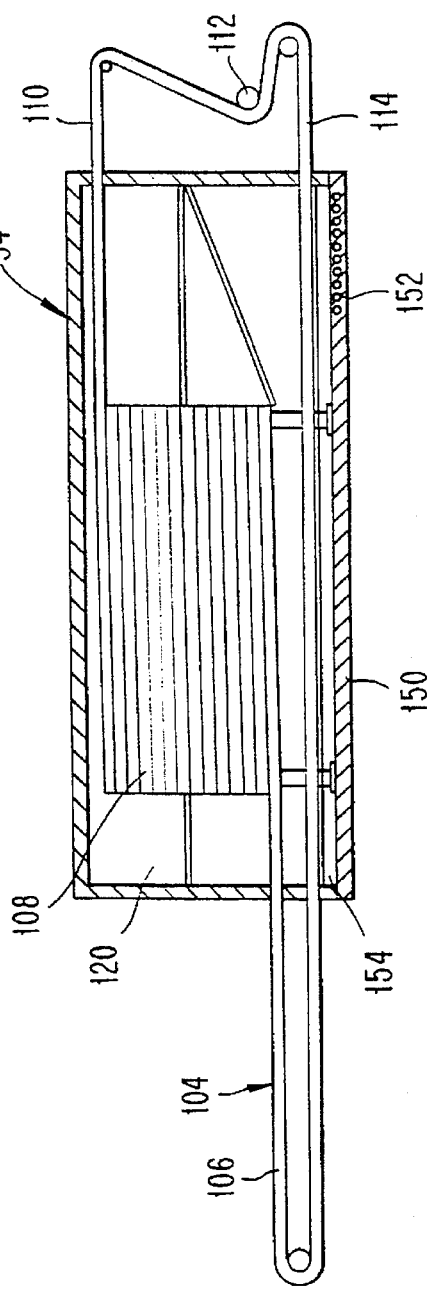
FIG. 4 is a partial cross-sectional view taken along the line 4—4 of FIG. 2.
Figure 6:
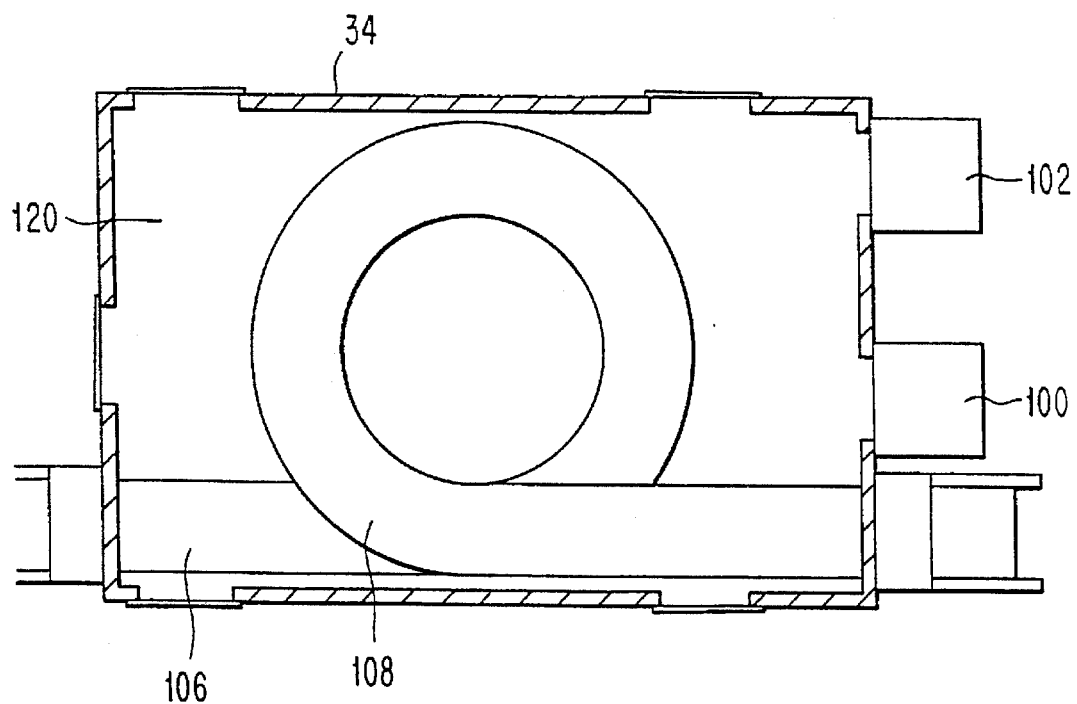
FIG. 6 is a partial cross-sectional view taken along the line 6—6 of FIG. 2.

To advance the muffin trays through the oven, an endless conveyor system 104 (see FIG. 4) is provided. This endless conveyor system 104 is built up from a plurality of conveyor elements each having a planar mesh bottom and a pair of planar sheet metal end plates which extend vertically upwardly from the bottom. On the feed apron, the endless conveyor system 104 has a generally linear feed portion 106 where the end plates of adjacent conveyor sections are aligned and define a trough with piecewise solid sides and a mesh bottom. The linear feed portion 106 extends into the oven interior 120 and smoothly joins a spiral conveyor section 108. In that spiral conveyor section 108, the end plates on the outer edge of the trough approximate chords of a large diameter circle while the end plates on the inner edge of the trough overlap one another and approximate chords of a smaller diameter circle (see FIG. 6). When the conveyor elements have made one complete path around the circle, they rest on the following portion of the conveyor that is just beginning to enter the spiral conveyor section 108 (see FIG. 3). There may be 20–25 helical wraps of conveyor elements in the spiral conveyor section 108.

At the top of the spiral conveyor section 108, the conveyor sections smoothly change to a discharge section 110 in which the end plates are again in alignment and a straight trough is again defined. The discharge section 110 extends from the spiral conveyor section 108 to the end of the discharge apron of the oven 34. Thereafter, the baking conveyor passes through a vertically oriented tensioning arrangement 112 where tension in the entire conveyor assembly 104 can be adjusted, and elements of the conveyor assembly descend from the discharge elevation to the feed elevation. From the tensioning arrangement 112, the conveyor elements pass back through the oven chamber 120, below the spiral conveyor portion 108 and ultimately join the feed conveyor portion 106.

With the multiple superposed wraps of the baking conveyor 104 in the spiral portion 108 within the oven chamber 120, the inner and outer end walls of each conveyor section cooperate to define a pair of annular walls through which the muffins pass. Moreover, the superposed wraps increase the residence time spent within the oven chamber 120 without creating an unduly slow or unduly long system.

The oven chamber 120 is divided into an upper chamber 122 and a lower chamber 124 by a generally horizontal partition 126 which extend from all walls of the oven 34 to the center of the chamber 120 where it has a generally circular opening sized to receive the circularly cylindrical spiral conveyor portion 108. The upper and lower chambers 122, 124 are further isolated from one another by a generally circular partition 128 located in the center of the spiral conveyor portion 108 and held in vertical position by suitable conventional supports (not shown) which may extend from the floor or the roof of the oven 34.

Gaseous communication between the upper and lower chambers 122, 124 can occur in several principal ways. First, gaseous communication can readily take place through the annular channel 130 defined between the inner cylindrical wall 134 and the outer cylindrical wall 132 of the spiral conveyor portion 108. Secondly, gaseous communication can readily take place through the heater units 100, 102. Moreover, the end plates of the oven conveyor are perforated so air can directly pass through the inner and outer walls of the annular chamber.

The heater units 100, 102 are substantially identical so it will suffice to describe one in detail. To this end, the heater unit 100 includes an open burner 140 which receives air from the upper chamber 122 and elevates its temperature as a result of burning fuel. The heater unit 100 also has a fan 142 which sucks the hot air from the combustion chamber and discharges it into the lower chamber 124 of the oven 34. Suitable conventional controls (not shown) are provided to regulate the air flow, temperature, and fuel consumption of the heater units. A directional baffle 144 extends from above the heater unit discharge elevation to the bottom of the spiral conveyor section 108 so that hot air is directed toward the annular channel connecting the upper and lower chamber 122, 124.

The floor 150 (see FIG. 4) of the oven 34 has internal conduits 152 for passage of cooling fluid, such as water, to regulate the temperature thereof.

Figure 5:
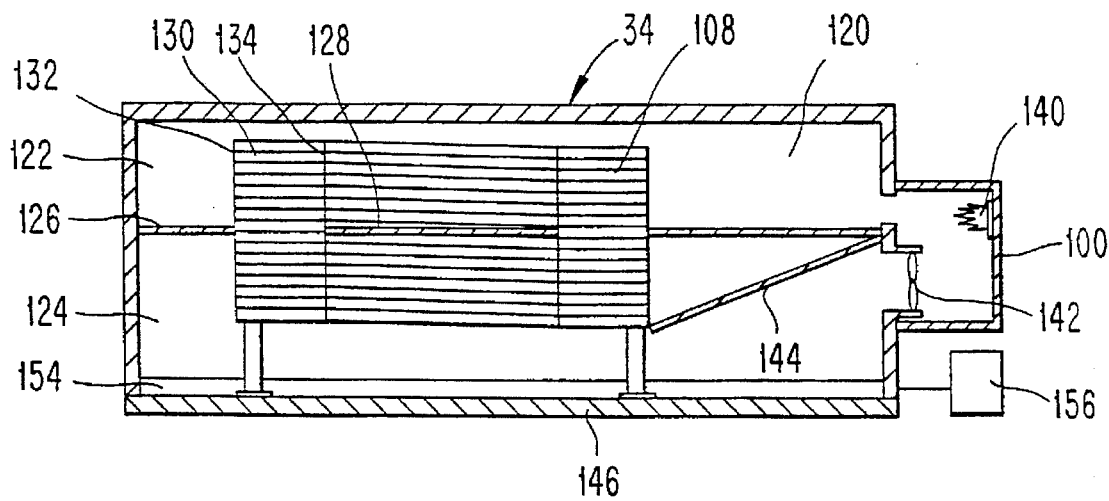
FIG. 5 is a partial cross-sectional view taken along the line 5—5 of FIG. 2.

An important aspect of the present baking process is the presence of a water bath 154 on the bottom of the lower oven chamber 124. Typically, the water bath 154 has a depth of about four inches. The cooling system for the floor 150 provides a means to adjust the temperature of water in the bath 154. Water level in the bath can be controlled in any suitable way. For example (see FIG. 5) a water supply unit 154 may include a conventional float valve that opens to permit water introduction when the level of the bath 154 drops below a first predetermined value and that closes to stop water introduction when the level of the bath exceeds a second predetermined value. The surface of the bath 154 is approximately twelve inches below the bottom of the spiral conveyor portion and is below the return portion of the baking conveyor system. With this relative position hot air from the heater units 100, 102 is forced to flow in close proximity to the surface of the water bath 154 before entering the annular channel through the spiral conveyor portion 108. As a result, the hot air picks up humidity that would not otherwise be present.

Figure 8:
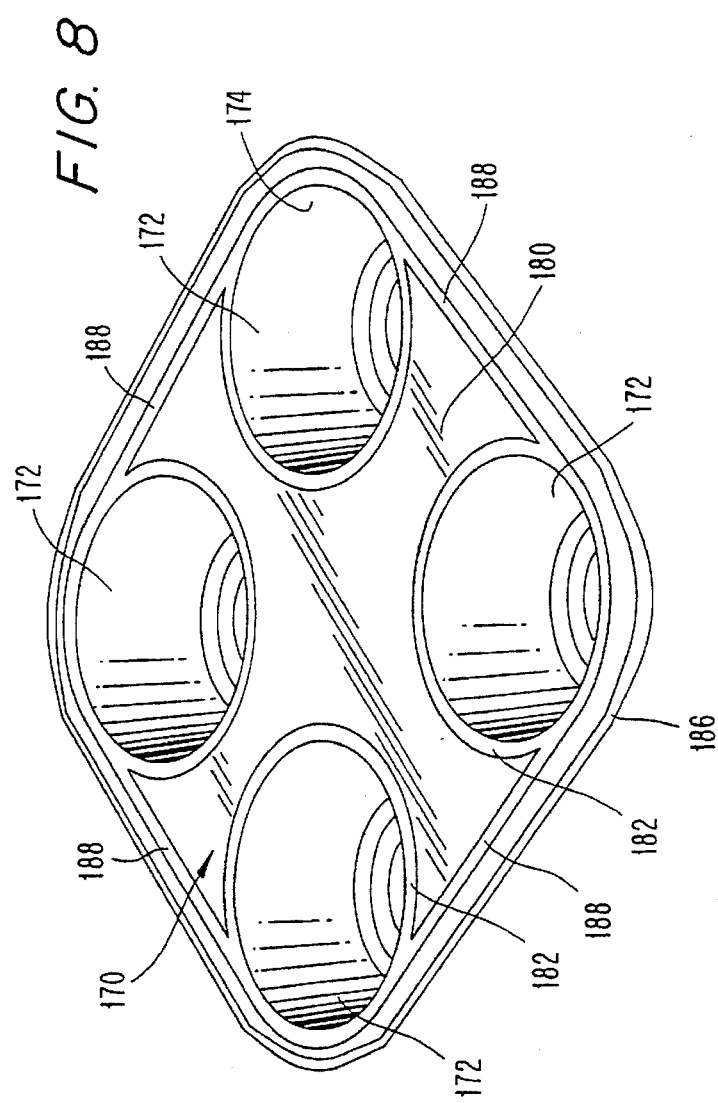
FIG. 8 is a perspective view of a muffin tray according to the present invention.

Turning now to the muffin tray used with this system, it is readily apparent that conventional metal muffin pans are unsuitable simply because of the associated expense and weight. Elimination of that expense is accomplished by using a thermoplastic material for the tray 170 (see FIG. 8). The reduced weight of plastic muffin pans, in contrast to the metal muffin pans, reduces belt loading on the conveyors which move the trays through the system. As a result of the lower weight of plastic pans, a greater density (i.e., number) of plastic pans can be used (as compared to metal pans) and the process gives an increased through put of product. The preferred thermoplastic material is modified crystallized polyethylene terephthalate (CPET) which is structurally stable in economical thicknesses at muffin baking temperatures of about 400° F. and is not unduly brittle at freezing temperatures as low as −30° F. CPET shrinks about 6% during the baking process, yet its crystallinity increases during that same baking process giving the tray enhanced strength as a result of the baking process.

Sheets of modified CPET are available commercially from a number of suppliers, including Genpak, Associated Packaging, and Thermoplate. While such sheets are still warm from extrusion-forming processes, the sheets can be readily formed into muffin trays 170 by conventional processes including, for example, plug-assisted molding. Recognizing that crystallinity of the CPET material affects its thermal stability, and further recognizing that the crystallinity increases with thermal cycles of heating and cooling, fewer thermal cycles are better than more thermal cycles. This advantageous result is effected by molding the muffin trays before the extrusion-formed sheet cools. As a result of the lower number of thermal cycles used here, the muffin trays exhibit reduced crystallinity compared to trays formed from cool sheets. Moreover, the muffin trays of this invention are less brittle when cold than are trays formed from cool sheets.

It will be understood by those skilled in the art that the arrangement of baking wells 172 in a muffin tray 170 can be selected in a variety of ways. Suitable arrangement include, for example, one row of two baking wells, one row of three baking wells, two rows of three baking wells each, two rows of four baking wells each, two rows of six baking wells each, three rows of three baking wells each, three rows of four baking wells each, three rows of five baking wells, and three rows of six baking wells. The baking process can handle any of these muffin tray arrangements, singly or in combination with one another. Nevertheless, there are certain characteristics of the muffin tray that are needed for success in the present invention. Accordingly, details of a two-by-two tray will be discussed, it being understood that characteristics of the baking wells and of the tray itself are common to trays of the various arrangements mentioned.

Figure 9:
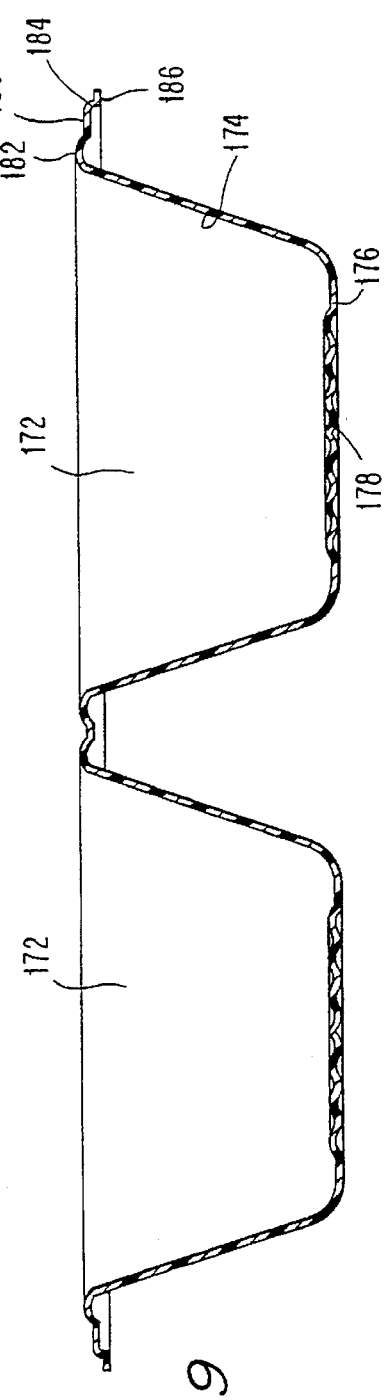
FIG. 9 is a partial cross-sectional view of the muffin tray of FIG. 7.

The tray includes a generally planar top portion from which baking wells 172 protrude. The top portion has a first surface from which the baking wells 172 project and a second surface on the opposite side of the top portion. Commonly, the first surface is considered to be the bottom surface and the second surface is considered to be the top surface. Each baking well 172 includes a frustoconical side wall 174 (see FIG. 9) extending downwardly with the larger end open upwardly. That frustoconical side wall 174 blends into a closed end such as the generally circular bottom surface 176 which closes the bottom of the baking well 172. A central portion of the bottom surface is provided with heat transfer impeding arrangement 178. In the illustrated embodiment, that heat transfer impeding arrangement 178 includes a plurality of concentric annular rings which alternately protrude above and below the otherwise planar bottom surface 176. This heat transfer impeding arrangement 178 has been found to be economically well-suited for use in the tray molding process since the molds are easily fabricated.

Figure 12:
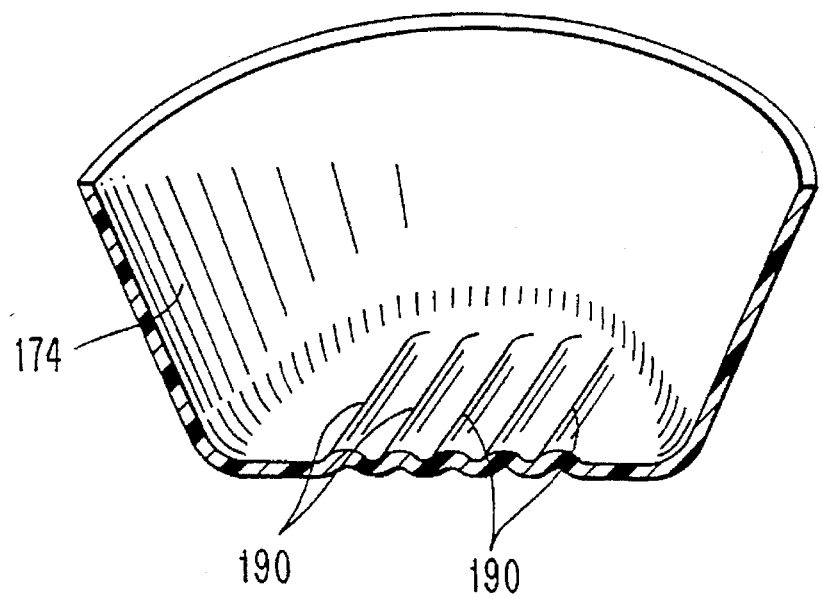
FIG. 12 is a detail view in partial cross-section of a baking well with parallel protrusions in its bottom.
Figure 13:
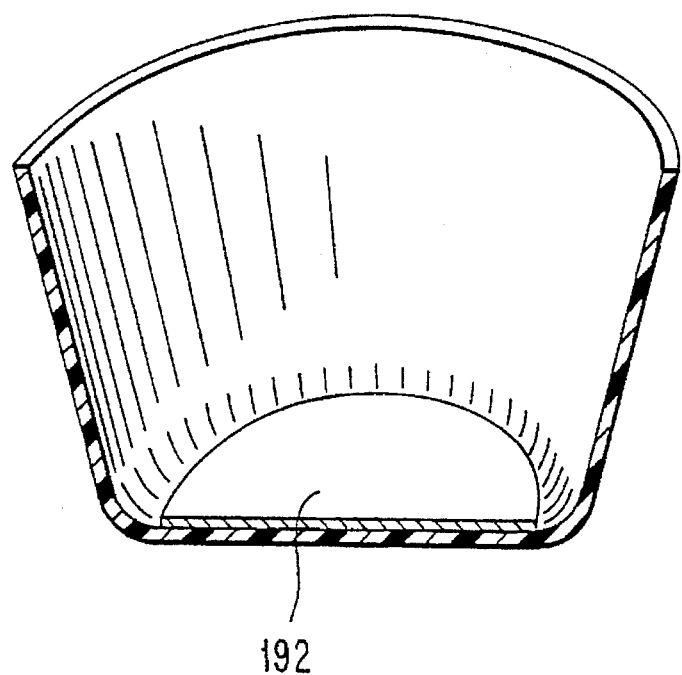
FIG. 13 is a detail view in partial cross-section of a baking well with a heat transfer inhibiting insert.

Nevertheless, there are a vast number of surface treatments for the bottom surface 176 that could be used, including without limitation, for example, (i) generally parallel, laterally spaced ridges 190 (see FIG. 12) or protrusions protruding above the bottom surface 176; (ii) intersecting sets of parallel ridges protruding above the bottom surface 176 defining a diamond-shaped or waffle-shaped pattern; (iii) an insulating material insert 192 (see FIG. 13) having a heat transfer coefficient that is less that the heat transfer coefficient for CPET; and (iv) combinations of one or more of the heat transfer impeding arrangements mentioned herein. Furthermore, if desired, ridge patterns may protrude only above, only below, or both above and below the bottom surface.

The top edge of each frustoconical side wall 174 is completely surrounded by a vertically extending curved protrusion or ridge 182 that protrudes above a planar top portion 180 of the tray 170. The ridge 182 completely encircles the frustoconical wall. The edge of the planar portion 180 of the tray 170 terminates in a downwardly curved arcuate surface 184 and an outwardly projecting flange 186. Furthermore, the planar portion 180 (see FIG. 8) also includes a ridge 188 extending tangentially between adjacent baking wells 172 and spaced from the perimeter flange 186 so as to be parallel thereto. In baking well arrangements such as a three-by-four configuration having one or more interior baking wells, there is no ridge 188 extending to those interior baking wells.

The ridges 182, 188 significantly contribute to structural stability of the tray 170 during the baking process. More particularly, the classical linear coefficient of thermal expansion is the same throughout the material used in the tray 170. Without the ridges 182, 188, the three-dimensional characteristics of the tray induce significant stresses in a cold tray during handling and processing; however, with the ridges 182, 188, those internal stresses are significantly reduced. The upwardly protruding ridge 182 around each baking well smoothly blends the planar portion 180 of the tray into the frustoconical wall 174 of each baking well and avoids sharp corners therebetween. In an analogous way, the upwardly protruding ridges 188 next to the perimeter flange 186 relieve internal stresses that occur between the flange and the planar portion 180, for example when the lid is applied.

The bottom surface 176 of each baking well 172 (see FIG. 9) blends into the frustoconical side wall 174 with a generous fillet radius. That fillet radius also relieves internal stresses at the bottom of the side wall 174 that would otherwise be induced by sharp corners there.

While prior art metal pans have had similar overall shapes, i.e., rows of baking wells, the linear coefficient of thermal expansion for thermoplastic materials is significantly larger than the corresponding coefficient for metal typically used in baking pans. As a result, thermal distortions have not presented equivalent distortion problems in metal pans.

The ridges 182, 188 could protrude either above or below the planar portion 180 of the tray 170. However, it is preferred that those ridges protrude above the planar portion 180 for several reasons. First, with the ridges 182, 188 extending above the planar portion while the flange 186 and arcuate edge 184 extend below the planar portion, the edge is stiffer than would be the case if the ridges extended to the same side of the plane. Second, the ridges 182 function as heat seal surfaces when the muffin tray is used to ship frozen muffin batter for retail bakers.

Figure 14:
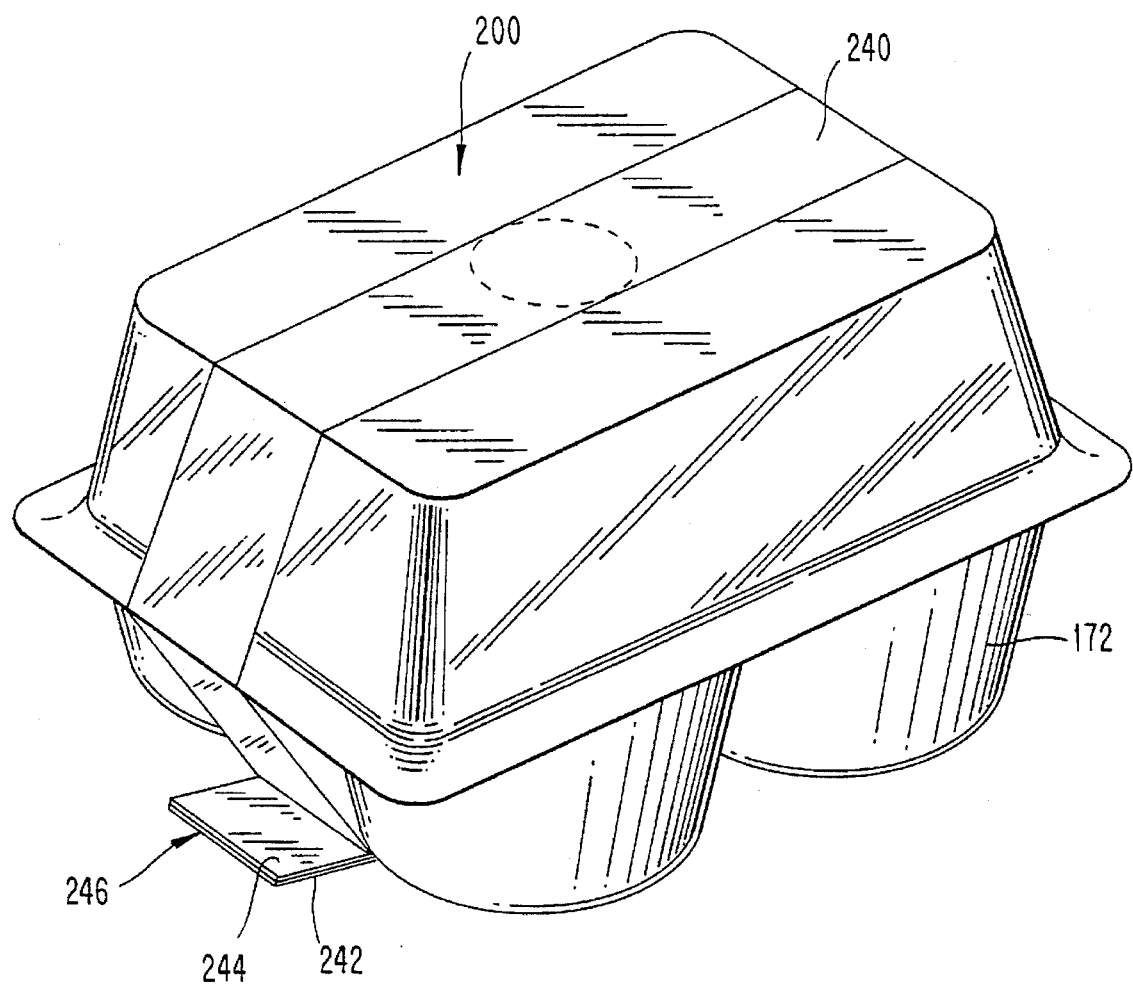
FIG. 14 is a perspective view of a tray/lid package with a tamper-evident seal.

As noted above, after the muffins are baked, a lid is applied and the tray/lid combination or package is labelled. Turning to FIG. 14, the covered package comprising the tray with baking wells 172 and the clear lid 200 is sealed with a multilayer laminated band 240 of uni-directional heat shrinkable material. The band 240 preferably includes at least two layers 242, 244. Product information is printed on a first one of the layers 242, 244 and the other layer is then laminated to the first layer such that the printed information is sealed between the two layers but is readable from the outside. Such an arrangement establishes significant print stability for the label since the printed information has scuff resistance due to its internal location in the laminate. The arrangement also offers a minimal likelihood of degradation in the printed information as a result of handling. The materials for the two layers 242, 244 are conventional; however, the material of one layer 242 is different from the material of the second layer 244. More particularly, the materials of the two layers 242, 244 are selected so that the layers can be heat sealed to one another but that heat sealed layers will readily delaminate.

In the labelling units, the label material is supplied in a continuous roll form. The label material is dispensed to a predetermined length corresponding to the repetition of printed matter. That predetermined length is then trimmed for use with the particular size of muffin tray/lid combination being packaged. The trimmed length is wrapped around the tray/lid combination or package forming a loop or band that envelops the tray/lid combination substantially perpendicularly to the parting line between the tray and its lid, and such that overlapping portions of the band are located at the bottom of the tray. Preferably, the band only covers part of the tray/lid combination. One end 246 of the band 240 extends beyond the bottom of the tray. The tray is placed on a heated platen carried by the underlying conveyor in the labelling unit. The platen is heated to a temperature sufficient to heat seal the overlapping portions of the band. After the heat sealing is finished, the tray/lid combination with the heat sealed band 240 passes through a heat tunnel in which the band is heat-shrunk by 2-3% so that it tightly holds the tray and associated lid together against potential tampering.

Furthermore, the end 246 of the band 240 still extends from the package and defines a tab useful for removal of the band 240. While the various lamina 242, 244 of the band are heat-sealed, those heat seals can be delaminated. For example, the heat seal bond between lamina is stronger in resisting shear forces that it is in resistance to tensile forces. Thus, by pulling the end 246 away from the package, i.e., down, the heat-sealed, overlapping portions of the band 240 are subjected to tensile forces and separate from one another so that the band 240 can be removed from the package. This arrangement also provides a tamper-evident seal for the package for several reasons: (i) the band 240 is shrunk from the time of its original application so it is very difficult to obtain registry of the overlapping portions a second time; and (ii) removal of the band with the pull tab 246 leaves visually identifiable indication that the band has been removed.

Having described the general muffin baking process, the spiral oven, the novel muffin trays, and the labelling arrangement, the operation of the process can now be described. A supply of muffin trays 170 (see FIG. 8) is maintained in the tray dispensing unit 20 (see FIG. 1) of the fill line. As individual trays are dispensed, the fill line conveyor 22 advances the trays to the liner dispenser 24 where a conventional paper baking cups is deposited in each well 172 (see FIG. 8) of each muffin tray 170. Conventional paper baking cups have a generally flat, circular bottom and a pleated, generally frustoconical side.

The fill line conveyor 22 (see FIG. 1) then advances the trays to the fill head 26 where a predetermined quantity of muffin batter is deposited in each paper baking cup. Muffin batter ordinarily is supplied at a temperature of 55° to 72° F., and preferably about 68° F. As the fill line conveyor 22 moves through the spray head 30, the muffin batter in the baking cups is coated with a mixture of oil and water to inhibit surface cracking during the baking process. The indexer 32, then arrays the muffin trays on the fill line conveyor 22 with the orientation and spacing desired for the continuous baking procedure.

Figure 7:
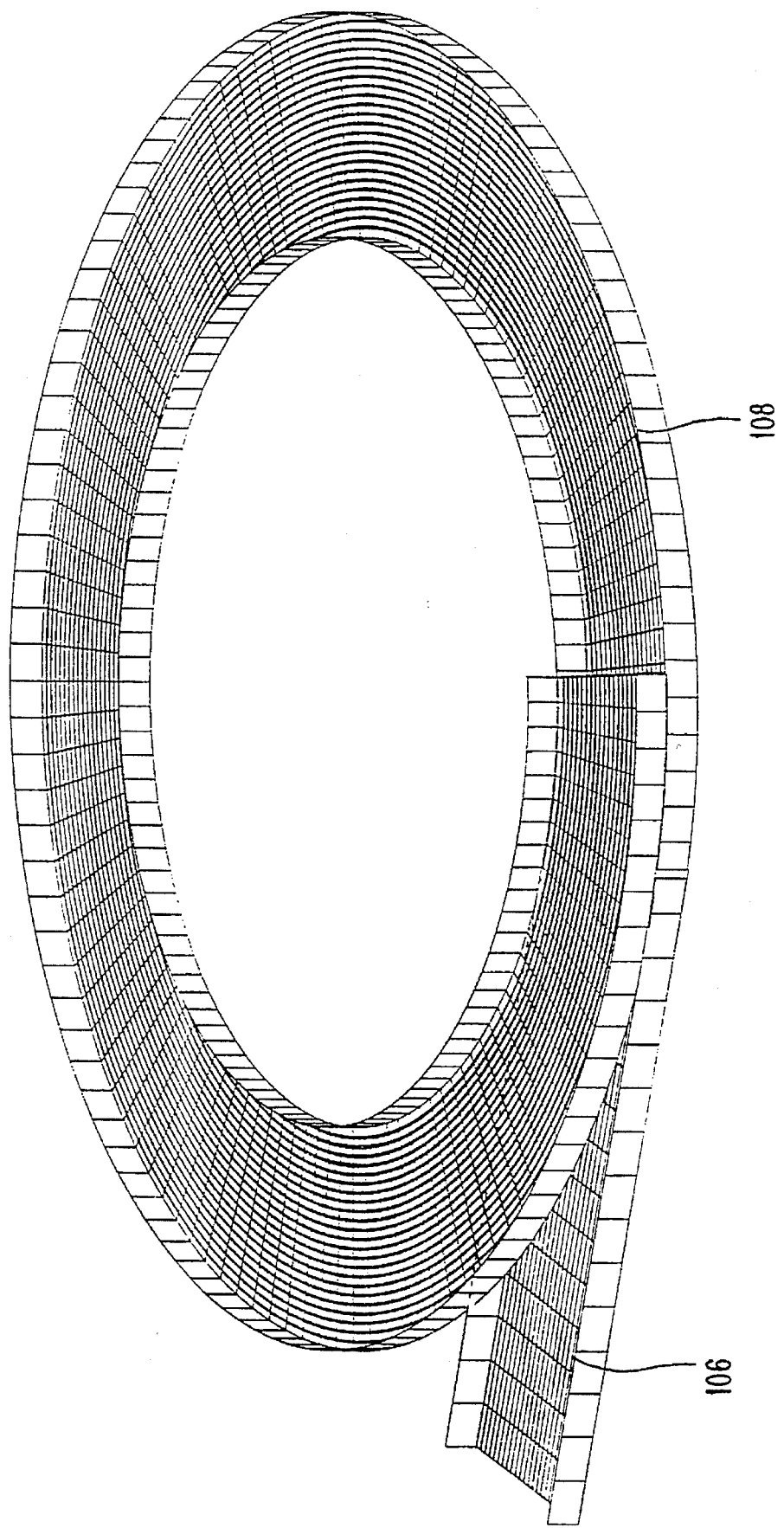
FIG. 7 is a perspective view of a portion of the baking conveyer used in the oven.

At the oven 34, the fill line conveyor 22 transfers the trays with unbaked batter to the baking conveyor on top of the feed apron 36. The feed portion 106 (see FIG. 4) of the baking conveyor 104 carries the trays into the lower chamber 122 of the oven 34 and on into the spiral portion 108. The muffin trays themselves are supported on the longitudinally extending bars (see FIG. 7) of the baking conveyor sections. As the baking conveyor continues to advance through the oven 34 (see FIG. 5), the muffin trays move helically around the annular portion of the oven conveyor and are advanced vertically with each circumferential pass. Baking temperature in the oven 34 is 385° F.

The major portion of the baking process actually occurs as the muffin tray moves through the spiral portion 108 of the baking conveyor which may include 27 helical turns. Here, hot air is continuously circulated around the muffin trays by action of the blower 142 of the heater assembly 100, 102. The blower 142 maintains a slightly higher pressure in the bottom chamber 124 of the oven 34 than the pressure which exists in the upper chamber 122. Moreover, the baffle 144 directs the dry, hot air from the burner element 140 over the large surface area of the pool 154 in the bottom of the oven 34. The dry, hot air transfers some heat to the water surface which helps drive the phase change and evaporation of water into the hot air, so that the hot air picks up moisture.

The moist, hot air then moves upwardly through the annular chamber in cross-flow relationship to the muffin trays which cover about 50–60% of the conveyor surface. More particularly, the muffin trays advance vertically a small increment for each revolution around the annular chamber whereas the moist, hot air moves substantially axially through the annular chamber. It will be recalled from FIG. 7 that individual elements of the baking conveyor 106 are fashioned with a mesh bottom surface defined, for example, by a series of parallel rods. Accordingly, the baking conveyor itself does not significantly impede the flow of hot air from the lower chamber 124 to the upper chamber 122.

While the actual mechanism has not yet been fully analyzed and understood, it appears that direct leakage of hot air at the top of the lower chamber 124 to the upper chamber 122 creates a temperature gradient in the oven 34 which increases from a lower value in the lower chamber 124 to a higher value in the upper chamber 122. The actual temperature difference has been found to be about 20° F. Direct leakage appears to occur (i) between the partition 126 and the outer wall of the annular chamber, (ii) between the inner wall and the central partition 128, and (iii) through perforations in the inner and outer walls. Hot air at the top of the lower chamber 124 is less likely to have transferred heat to the water surface and is, therefore, likely to be at a higher temperature than air passing close to that surface.

So that baking soda in the muffin batter can cause that batter to blossom consistently and effectively, the core temperature of the batter needs to reach a temperature of about 200° F. in 8 to 10 minutes after the baking step begins. At the same time, heat application to the shaped muffin batter must be uniform to prevent differential browning and baking of the external parts. Moreover, the exposed surface of the muffin batter must not be heated too quickly or it becomes dry and rigid and impedes blossoming of the muffin. The tray design, in combination with humidity control of the baking air, and the two chamber convection oven heating cooperate to yield superior baking results. More particularly, heat transfer to the frustoconical side of the batter is impeded by air spaces between the frustoconical side of the baking cup and the frustoconical side 172 (see FIG. 8) of the tray 170. Moreover, the heat transfer impeding arrangement 178 (see FIG. 9) in the bottom of each baking well established a comparable heat transfer to the bottom of the muffin batter. Since the convention air moves upwardly against the bottom of the tray 170, the top of the muffin batter is not exposed to the drying effect of a hot air current-rather the muffin top see turbulent energy-dissipating eddies which do not convey moisture away from the batter as easily.

Whatever actual physical mechanism takes place, the muffins baked in this process exhibit superior characteristics as compared with prior processes. While other baking processes cause water bake-off losses of 12.2–12.3%, this process consistently yields water bake-off losses of 9%—resulting in a moister muffin. Furthermore, the blossomed muffin batter enters the upper chamber 122 with a higher temperature so that browning occurs after blossoming giving a lighter crust on the muffin.

Figure 10:
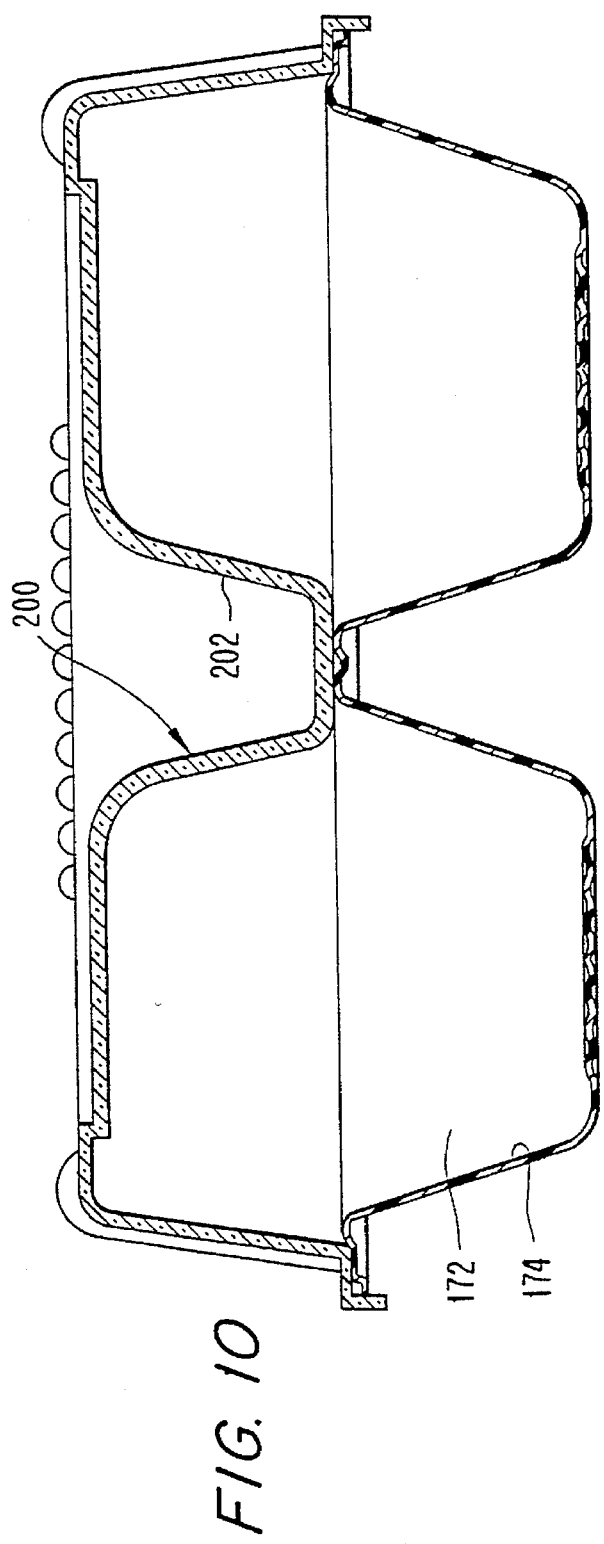
FIG. 10 is a partial cross-sectional view of a muffin tray with a dome cover.

The trays of baked muffin leave the oven 34 and are advanced to the freezer 42. The freezer preferably is a spiral freezer in which a conveyor belt spirals downwardly through an annular region while frigid air is circulated upwardly through that same annular region. By the time the trays of baked muffins reach the bottom of the freezer 42, the muffins are thoroughly frozen and ready for storage and/or distribution. Nevertheless, the trays of baked muffins are discharged from the freezer 42 and directed to the packaging line where the packaging conveyor 50 moves the baked trays through one of two parallel domer units in which a clear plastic lid 200 (see FIG. 10) is applied to the tray. While the plastic lid may have any one of a variety of designs, as illustrated there may be one or more projections 202 positioned to rest on the tray between adjacent baking wells 172. The lid 200 may be fashioned from clear polyethylene terephthalate and may have a thickness comparable to the thickness of the baking tray.

After check weighing and metal detection, the covered packages are labelled with a tamper evident label and packed in cases.

Figure 11:
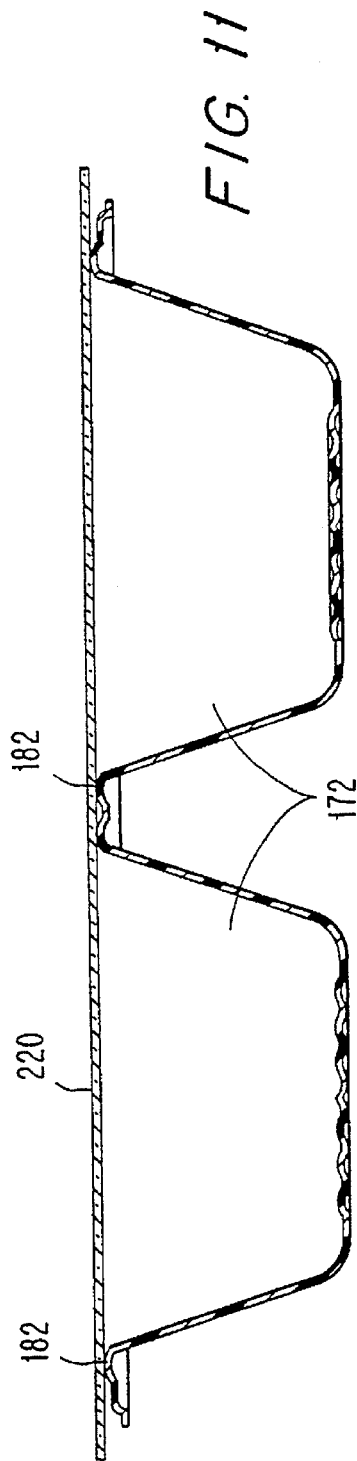
FIG. 11 is a partial cross-sectional view of a muffin tray with a cover sheet.

In the event that unbaked muffin batter is to be shipped, the same fill line (see FIG. 1) can be used. The oven 34 is not, however, fired so no baking occurs. But, the unbaked batter is frozen paper cups in the muffin trays by the same spiral freezer 42. Accordingly, the freezer 42 discharges muffin trays with batter ready for baking by a retail baker. The trays of frozen batter are advanced by the conveyor 70 to an indexer unit 72 and to one of two heat sealing units 74, 76 where a thin, clear sheet of plastic 220 (see FIG. 11) is sealed directly to the top of the tray. The circumferential ridge 182 (see FIG. 8) around the top of each baking well 172 provides a heat-seal surface that cooperates with the plastic sheet to seal each baking well independently of each other baking well in the tray. As a result, even if the muffin tray is tilted at a severe angle the batter in one well cannot commingle with the batter in an adjacent well and cannot spill from the tray itself.

To use the frozen batter, a retail baker need only defrost a tray of batter, remove the covering sheet of plastic, bake that same tray, and display the baked muffins for retail sale.

The muffin trays described above present significant improvements over known muffin trays. In particular, the tray design carefully limits thermal distortion of the muffin tray during baking processes. The tray design cooperates with use of conventional paper baking cups to give a substantially uniform heat transfer to all sides of the muffin that contact the muffin tray resulting in uniform baking without localized burning or over-baking. The tray design also provides a sufficiently rigid arrangement that a hot muffin tray can be picked up and moved despite the reduces stiffness associated with the tray material at muffin baking temperatures. Furthermore, the tray can be used not only for baking, and distribution of baked muffins, but also for distribution of frozen muffin batter for retail baking.

The baking process also offers significant improvements relative to the known prior art processes. For example, from the perspective of operational economics, the novel baking process eliminates the waste associated with muffin baking processes using metal pans—waste that involved as much as 25% of the product. In addition, the novel baking process eliminates the economic burden associated with charges for waste water treatment. From the perspective of the ultimate product, the present process also presents advantages: the resulting muffin has a higher moisture content and is therefore moister than prior art baking processes; the resulting muffin has a relatively thin top crust; and the resulting muffin has a uniformly baked perimeter inside the paper baking cup.

The baking process with its humidity control is believed to provide some of these distinct advantages. It should be noted that alternate approaches to humidity control did not give comparable results. For example, in conventional ways, steam was introduced both upstream and downstream of the burner elements. Neither approach however produced muffins with the characteristics that results from humidity control with a water pool.

It should now be apparent that a novel muffin tray and novel muffin baking process have been described which overcome problems associated with prior art devices and which generate significant advantages when compared to those prior art devices. Moreover, it will be apparent to those skilled in the art that numerous modifications, variations, substitutions and equivalents exist for features of the invention that do not materially depart from the spirit and scope of the invention. Accordingly, it is expressly intended that all such modifications, variations, substitutions, and equivalents that fall within the scope of the appended claims shall be embraced thereby.

What is claimed is:

1. A tray for baking, distribution, and merchandising, comprising: a generally planar top portion having a first side, a second side, and a plurality of baking wells
    commonly spaced from one another in the top portion, each baking well extending from the first side and having:
    a closed end;
    a generally frustoconical wall with an open end having a larger diameter than the closed end, the open end being joined to the planar top portion with a heat seal surface formed as a curved protrusion completely encircling the frustoconical wall and extending from the second side; and
    heat transfer reducing means at the closed end for reducing the heat transferred during baking to the closed end of the baking well in comparison to the frustoconical wall;
the tray portion and the baking wells being integrally formed from crystalline polyethylene terephthalate.

2. The muffin tray according to claim 1 wherein the heat transfer reducing means includes a plurality of concentric rings protruding from the bottom surface of each baking well toward the tray portion.

3. The muffin tray according to claim 1 wherein the heat transfer reducing means includes a plurality of parallel protrusions extending from the bottom surface of each baking well toward the tray portion.

4. The muffin tray according to claim 1 wherein the heat transfer reducing means includes an insert of material having a lower heat transfer coefficient than the heat transfer coefficient of crystalline polyethylene terephthalate.

5. The muffin tray according to claim 1 further including a peripheral flange offset from the plane of the top portion and spaced from the first side thereof such that flexural stiffness of the top portion is increased.

6. The muffin tray according to claim 5 further including a clear lid formed of clear polyethylene terephthalate engaging and retained by the peripheral flange.

7. The muffin tray according to claim 1 further including a sheet of plastic material sealed to the protruding bead encircling each of the baking wells.

8. The muffin tray according to claim 1 further including a predetermined quantity of unbaked muffin batter in each baking well.

* * * * *